United States Patent
Zhang et al.

(10) Patent No.: US 11,652,416 B2
(45) Date of Patent: May 16, 2023

(54) POWER CONVERTER WITH CROSS COUPLED CAPACITORS

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 18 days.

(21) Appl. No.: 17/367,473

(22) Filed: Jul. 5, 2021

(65) Prior Publication Data
US 2022/0029540 A1   Jan. 27, 2022

(30) Foreign Application Priority Data

Jul. 23, 2020   (CN) .......................... 202010728333.1

(51) Int. Cl.
*H02M 3/158* (2006.01)
*H02M 1/00* (2006.01)

(52) U.S. Cl.
CPC ....... *H02M 3/1586* (2021.05); *H02M 1/0095* (2021.05); *H02M 1/0067* (2021.05)

(58) Field of Classification Search
CPC ......... H02M 1/0095; H02M 3/07–078; H02M 3/1584; H02M 3/1586
See application file for complete search history.

(56) References Cited

U.S. PATENT DOCUMENTS

| | | | |
|---|---|---|---|
| 8,581,518 B2 | 11/2013 | Kuang et al. | |
| 2005/0213267 A1* | 9/2005 | Azrai | H02M 3/07 361/15 |
| 2011/0127925 A1 | 6/2011 | Huang et al. | |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0091817 A1* | 3/2020 | Teplechuk | H02M 3/07 |
| 2021/0119540 A1* | 4/2021 | Kawano | H02M 3/158 |
| 2021/0203233 A1* | 7/2021 | Chang | H02M 3/077 |

FOREIGN PATENT DOCUMENTS

CN   107346940 A   11/2017

* cited by examiner

*Primary Examiner* — Peter M Novak

(57) ABSTRACT

A power converter can include: a plurality of circuit modules coupled in parallel between a first port and a second port, where each of the plurality of circuit modules includes a switching power stage circuit having a first magnetic element coupled between a switch node of the switching power stage circuit and a first terminal of the second port, at least one switch group having first and second transistors and being coupled between a first terminal of the first port and a first terminal of the switching power stage circuit, and at least one first energy storage capacitor for providing energy to a load of the power converter; and a plurality of second energy storage capacitors configured to periodically store energy and release energy to corresponding first energy storage capacitors.

18 Claims, 4 Drawing Sheets

POWER CONVERTER WITH CROSS COUPLED CAPACITORS

RELATED APPLICATIONS

This application claims the benefit of Chinese Patent Application No. 202010728333.1, filed on Jul. 23, 2020, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With continued societal development, high-gain power converters have become an indispensable part of energy utilization. In order to reduce an output capacitor that is required for reducing the ripple of the output current, an interleaved parallel connection at the output side of the power converter can be adopted. However, due to the relatively large and possibly discontinuous ripple of the input current, a relatively large input capacitor may still be needed.

Figure 1:
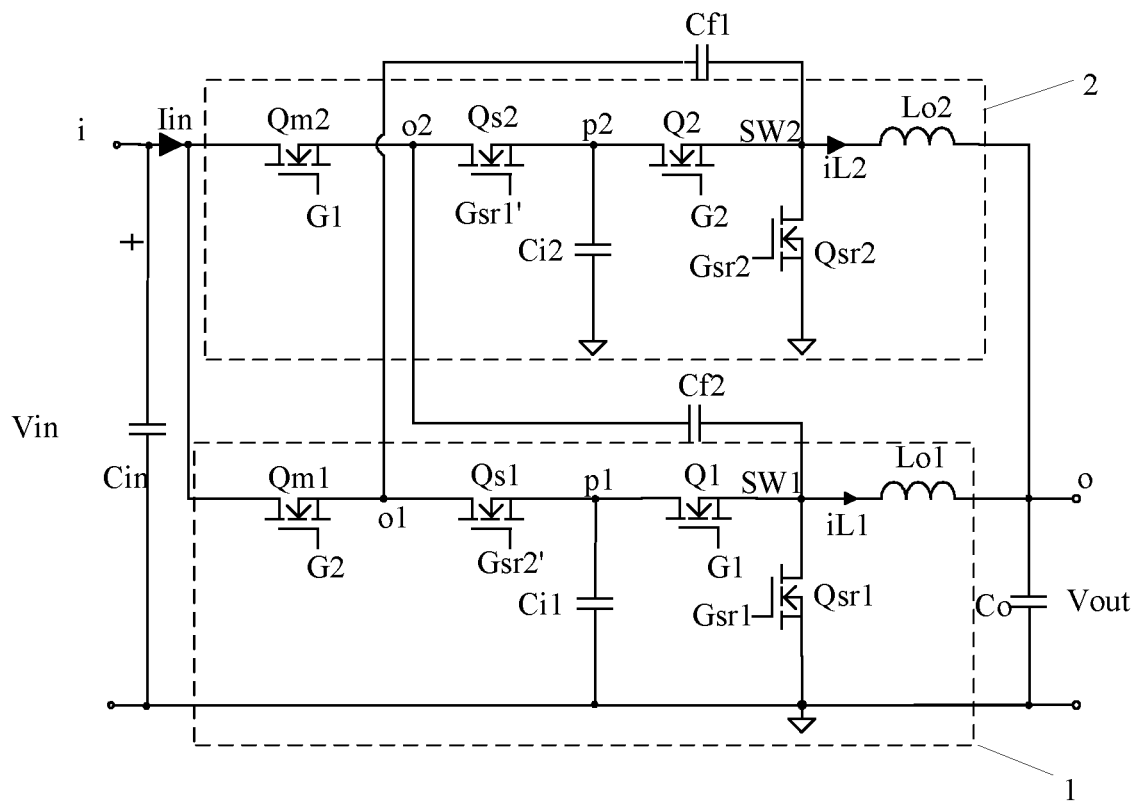
FIG. 1 is a schematic block diagram of a first example power converter, in accordance with embodiments of the present invention.

Referring now to FIG. 1, shown is a schematic block diagram of a first example power converter, in accordance with embodiments of the present invention. In this particular example, the power converter can include two circuit modules. A "module" as used herein can be any hardware circuit structure. First ports of circuit modules 1 and 2 can connect in parallel to serve as a first port of the power converter for receiving input voltage Vin. A filter capacitor can connect between a first terminal and a second terminal (e.g., a reference ground) of the first port of the power converter. Here, the filter capacitor can be input capacitor Cin. Second ports of circuit modules 1 and 2 can connect in parallel as a second port of the power converter for generating output voltage Vout. A filter capacitor can connect between a first terminal and a second terminal (e.g., a reference ground) of the second port of the power converter. Here, the filter capacitor can be output capacitor Cout.

In this example, circuit module 1 can include a switching power stage circuit, which can include a magnetic element connected between switch node SW1 of the switching power stage circuit and terminal "o" of the second port of the power converter. Circuit module 1 can also include a switch group connected between terminal "i" of the first port of the power converter and a first terminal (e.g., an input terminal) of the switching power stage circuit. Here the magnetic element can be inductor Lo1, and the switch group can include transistors Qm1 and Qs1 connected in series.

In this example, circuit module 1 can also include energy storage capacitor Ci1 for providing energy to a load of the power converter as a power source. Energy storage capacitor Ci1 can connect between first-type node p1 of the switch group and the reference ground, where first-type node p1 is a second terminal of the switch group, and is a common node of the switch group and the switching power stage circuit. When each circuit module includes multiple switch groups, the first-type node may also be a common node of different switch groups. In addition, the switching power stage circuit can include transistors Q1 and Qsr1, which can connect in series between first-type node p1 and the reference ground. In this example, transistor Q1, transistor Qsr1, inductor Lo1, and output capacitor Co together may form a buck circuit. However, when the first port is an output port and the second port is an input port, the switching power stage circuit is a boost circuit. It should be understood that transistor Qsr1 can also be replaced by a diode here, and the switching power stage circuit can also be other circuitry (e.g., transistors, magnetic element(s), etc.).

Similarly, circuit module 2 can include a switching power stage circuit, which can include a magnetic element connected between switch node SW2 of the switching power stage circuit and terminal "o" of the second port. Circuit module 2 can also include a switch group connected between terminal "i" of the first port and a first terminal (e.g., an input terminal) of the switching power stage circuit, where the magnetic element can be inductor Lo2, and the switch group can include transistors Qm2 and Qs2 connected in series. Circuit module 2 can also include energy storage capacitor Ci2 for providing energy to the load of the power converter as a power source. Energy storage capacitor Ci2 can connect between first-type node p2 of the switch group and the reference ground. In addition, the switching power stage circuit can include transistors Q2 and Qsr2. Similarly, transistors Q2 and Qsr2, inductor Lo2, and output capacitor Co may form a buck circuit. However, when the first port is an output port and the second port is an input port, transistors Q2 and Qsr2, inductor Lo2, and output capacitor Co may form a boost circuit. It should be understood that transistor Qsr2 can also be replaced by a diode in some cases.

In one embodiment, the power converter can also include two energy storage capacitors Cf1 and Cf2. A first terminal of energy storage capacitor Cf1 can connect to intermediate node of of the switch group in circuit module 1 (e.g., a common node of transistors Qm1 and Qs1), and a second terminal of energy storage capacitor Cf1 can connect to switch node SW2 of the switching power stage circuit in circuit module 2. A first terminal of energy storage capacitor Cf2 can connect to intermediate node o2 of the switch group in circuit module 2 (e.g., a common node of transistors Qm2 and Qs2), and a second terminal of energy storage capacitor Cf2 can connect to switch node SW1 of the switching power stage circuit in circuit module 1. In this example, energy storage capacitor Cf1 may periodically store energy and release energy to energy storage capacitor Ci1, and energy storage capacitor Cf2 may periodically store energy and release energy to energy storage capacitor Ci2.

In one embodiment, driving signals of transistors Q1 and Q2 of the switching power stage circuit in circuit modules 1 and 2 are G1 and G2, respectively, and driving signals of transistors Qsr1 and Qsr2 are Gsr1 and Gsr2, respectively. The driving signal of transistor Qm2 connected to the first terminal of energy storage capacitor Cf2 can be the same as the driving signal of transistor Q1 in circuit module 1 that connects to the second terminal of energy storage capacitor Cf2; that is, the driving signal of transistor Qm2 can also be G1. Similarly, the driving signal of transistor Qm1 connected to the first terminal of energy storage capacitor Cf1 may be the same as the driving signal of transistor Q2 in circuit module 2 that connects to the second terminal of energy storage capacitor Cf1; that is, the driving signal of transistor Qm1 is also G2.

The driving signals of the "third" transistor (e.g., Q1 and Q2) and the "fourth" transistor (e.g., Qsr1 and Qsr2) in each switching power stage circuit may not overlap each other. For example, the driving signals of the third and fourth transistors can be complementary. Further, a conduction time of the "second" transistor (e.g., Qs1 and Qs2) in each switch group may not be greater than a conduction time of the corresponding fourth transistor in that switch group, and the driving signals of the "first" transistor (e.g., Qm1 and Qm2) and the second transistor in each switch group may not overlap each other. For example, the pulse width of driving signal Gsr1' of transistor Qs2 is within the pulse width of driving signal Gsr1 of transistor Qsr1, and the pulse width of driving signal Gsr2' of transistor Qs1 is within the pulse width of driving signal Gsr2 of transistor Qsr2. For example, driving signal Gsr1' is the same as driving signal Gsr1, and driving signal Gsr2' is the same as driving signal Gsr2.

There can be different control methods for the power converter in particular embodiments. The first such control method is in-phase control; that is, driving signals G1 and G2 of transistors Q1 and Q2 are the same. In this control method, the currents flowing through the input terminals of circuit modules can be the same during one operating stage, which may reduce the current stress of the transistor, but may also have no effect on the ripple of input current Iin of the power converter. The second control method is phase shift control; that is, driving signals G1 and G2 may have the same period and duty cycle, and the phases of driving signals G1 and G2 can be shifted by a predetermined angle for control. For example, the phases of driving signals G1 and G2 are shifted by 180°. In this control mode, the currents at the input terminals of circuit modules can be generated alternately, which can reduce the ripple of input current Iin of the power converter, and make input current Iin more continuous, thereby reducing the volume of input capacitor Cin.

Figure 2:
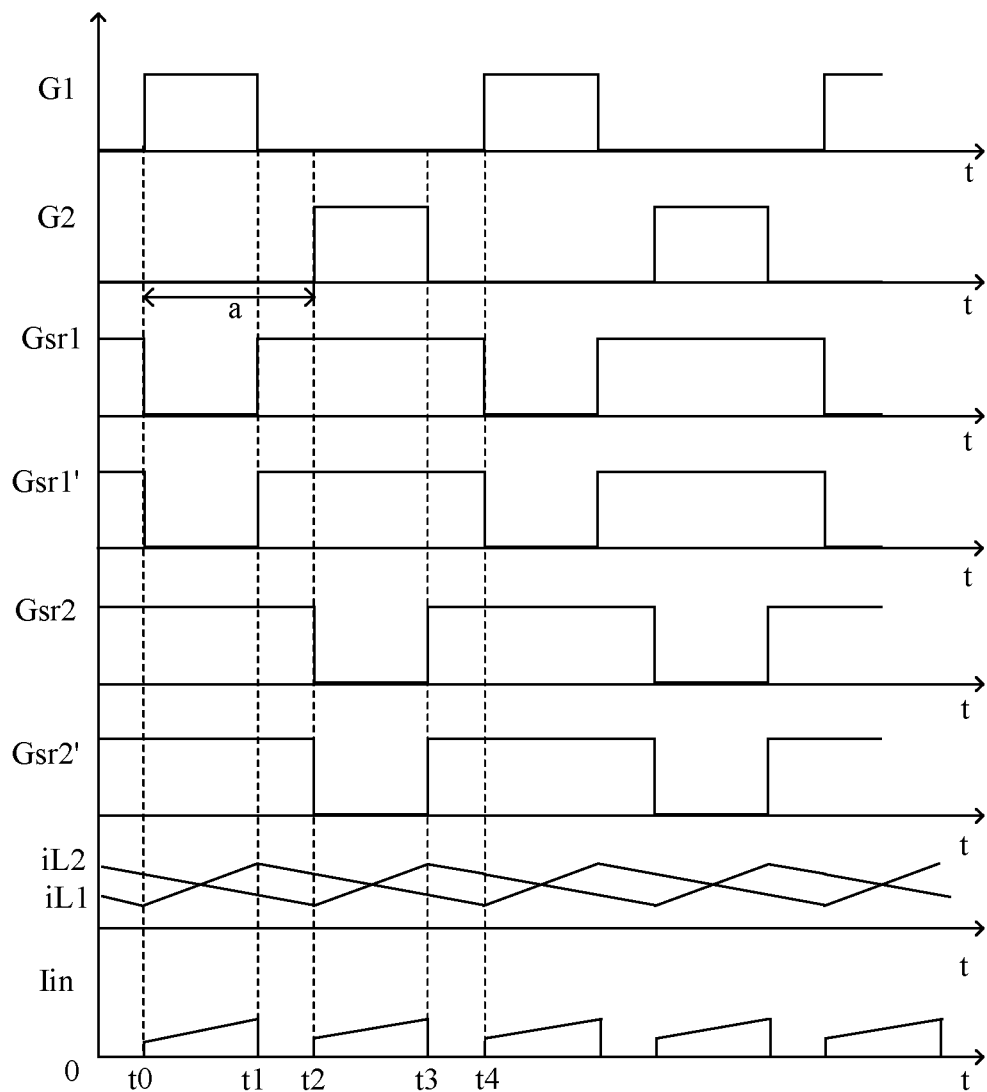
FIG. 2 is a waveform diagram of example operation of the first example power converter, in accordance with embodiments of the present invention.

Referring now to FIG. 2, shown is a waveform diagram of example operation of the first example power converter, in accordance with embodiments of the present invention. In this particular example, drive signals G1, G2, Gsr1, Gsr1', Gsr2, and Gsr2', inductor currents iL1 and iL2, and input current Iin are shown in turn. Taking phase shift control as an example, driving signals G1 and G2 may have the same period and duty cycle D, and driving signal G1 may lead driving signal G2 by predetermined angle α, e.g., where α=180°. Driving signal Gsr1 of transistor Qsr1 can be complementary to driving signal G1 of transistor Q1, and may be the same as driving signal Gsr1' of transistor Qs2. Driving signal Gsr2 of transistor Qsr2 can be complementary to driving signal G2 of transistor Q2, and may be the same as driving signal Gsr2' of transistor Qs1. Therefore, the power converter in this example can adjust duty cycle D to adjust output voltage Vout and maintain the stability of output voltage Vout.

The following is a detailed description of operation principle with the waveform diagram. During period t0-t1, driving signal G1 can be active, transistors Q1 and Qm2 may be turned on, and transistors Qsr1 and Qs2 can be turned off. Energy storage capacitor Ci1 can be used as a power source to supply power to the load through the switching power stage circuit, and input voltage Vin may supply power to charge energy storage capacitor Cf2 through transistor Qm2 and supplies power to the load. During this period, inductor current iL1 can rise, and transistors Qm2 and Q1 can be equivalently considered as being coupled in parallel to serve as a main power transistor of the buck circuit. In this way, transistors Qm2 and Q1 can essentially shunt half of inductor current iL1 at the same time, such that the ripple of input current Iin is reduced. In addition, transistors Qsr2 and Qs1 may remain turned on, inductor current iL2 can continue to decrease, and energy storage capacitor Cf1 may release energy through transistor Qs1 to charge energy storage capacitor Ci1. In this period, circuit module 1 may operate in a first operation stage, and circuit module 2 may operate in a second operation stage.

During period t1-t2, driving signal G1 can be switched to be inactive, driving signals Gsr1 and Gsr1' can be active, thus transistors Qsr1 and Qs2 may be turned on, inductor current iL1 can begin to freewheel and decrease, and energy storage capacitor Cf2 can be discharged through transistor Qs2 to charge energy storage capacitor Ci2. In addition, transistors Qsr2 and Qs1 may remain turned on, inductor current iL2 can continue to decrease, and energy storage capacitor Cf1 may release energy through transistor Qs1 to charge energy storage capacitor Ci1. Since transistors Qm2 and Qm1 are both turned off, input current Iin can be zero. In this period, both circuit modules 1 and 2 may operate in the second operation stage.

During period t2-t3, driving signal G2 can be switched to be active, transistors Qm1 and Q2 can be turned on, and transistors Qsr2 and Qs1 turned off. Energy storage capacitor Ci2 can be used as a power source to supply power to the load through the switching power stage circuit. Input voltage Vin can supply power to charge energy storage capacitor Cf1 through transistor Qm1, and supply power to the load.

During this period, inductor current iL2 can rise, and transistors Qm1 and Q2 can be equivalently considered as being coupled in parallel to serve as a main power transistor of the buck converter. In this way, transistors Qm1 and Q2 may essentially shunt half of inductor current iL2 at the same time, such that the ripple of input current Iin is reduced. In addition, since transistors Qsr1 and Qs2 remain on, inductor current iL1 can continue to decrease, and energy storage capacitor Cf2 may release energy through transistor Qs2 to charge energy storage capacitor Ci2. During this period, circuit module 1 may operate in the second operation stage, and circuit module 2 may operate in the first operation stage.

During period t3-t4, driving signal G2 can be inactive, and driving signals Gsr2 and Gsr2' may be active. Therefore, transistors Qm1 and Q2 can be turned off, and transistors Qsr2 and Qs1 turned on. Inductor current iL2 may begin to freewheel and decrease, and energy storage capacitor Cf1 can release energy through transistor Qs1 to charge energy storage capacitor Ci1. In addition, since transistors Qm2 and Qm1 are both turned off, input current Iin can be zero at this period. At the same time, transistors Qsr1 and Qs2 may remain on, such that inductor current iL1 can continue to decrease, and energy storage capacitor Cf2 may release energy through transistor Qs2 to charge energy storage capacitor Ci2 until driving signal G1 is active. During this period, both circuit modules 1 and 2 may operate in the second operation stage. Thereafter, the power converter may periodically repeat this process.

In particular embodiments, when each circuit module can include one switch group, during the first operation stage of each switching power stage circuit where the inductor current rises, input voltage Vin and the first energy storage capacitor (e.g., Ci1 and Ci2) in the circuit module may provide energy to the corresponding circuit module at the same time. The second energy storage capacitor (e.g., Cf1 and Cf2) connected to the switch node of the switching power circuit may store energy during the first operation stage of the switching power stage circuit, and can release energy to the corresponding first energy storage capacitor during the second operation stage. Here, the corresponding first energy storage capacitor can be coupled to the first terminal of the second energy storage capacitor through a second transistor (e.g., Qs1 and Qs2). In the above operating process, according to the inductance volt-second balance of the switching power stage circuit, the following formulas can be obtained.

$$(V_{in} - V_{cf2}) \times D = V_{out} \quad (1)$$

$$V_{ci1} \times D = V_{out} \quad (2)$$

$$(V_{in} - V_{cf1}) \times D = V_{out} \quad (3)$$

$$V_{ci2} \times D = V_{out} \quad (4)$$

Here, Vci1 is a voltage across energy storage capacitor Ci1, Vci2 is a voltage across energy storage capacitor Ci2, Vcf1 is a voltage across energy storage capacitor Cf1, and Vcf2 is a voltage across energy storage capacitor Cf2. According to a charging loop circuit for the second energy storage capacitor releasing energy to charge the first energy storage capacitor, the following formulas can be obtained.

$$V_{cf1} = V_{ci1} \quad (5)$$

$$V_{cf2} = V_{ci2} \quad (6)$$

Combining the above formulas, the relationship between input voltage Vin and output voltage Vout can be obtained as follows: Vout/Vin=D/2. In addition, input current Iin can be the sum of the currents flowing through transistors Qm1 and Qm2, and input current Iin can essentially be equal to ½ of the inductor current during the first operation stage of each switching power stage circuit as shown in FIG. 2. Therefore, as compared with only one transistor at the input port of the power converter, the ripple of the input current can be equal to the ripple of the inductor current, and providing that the average input current is the same, the ripple of input current Iin can be reduced compared to the ripple of the inductor current by utilizing the power converter of particular embodiments. In addition, the frequency of the ripple of input current Iin can be twice the switching frequency, such that the input current is more continuous, and input capacitor Cin is reduced.

Figure 3:
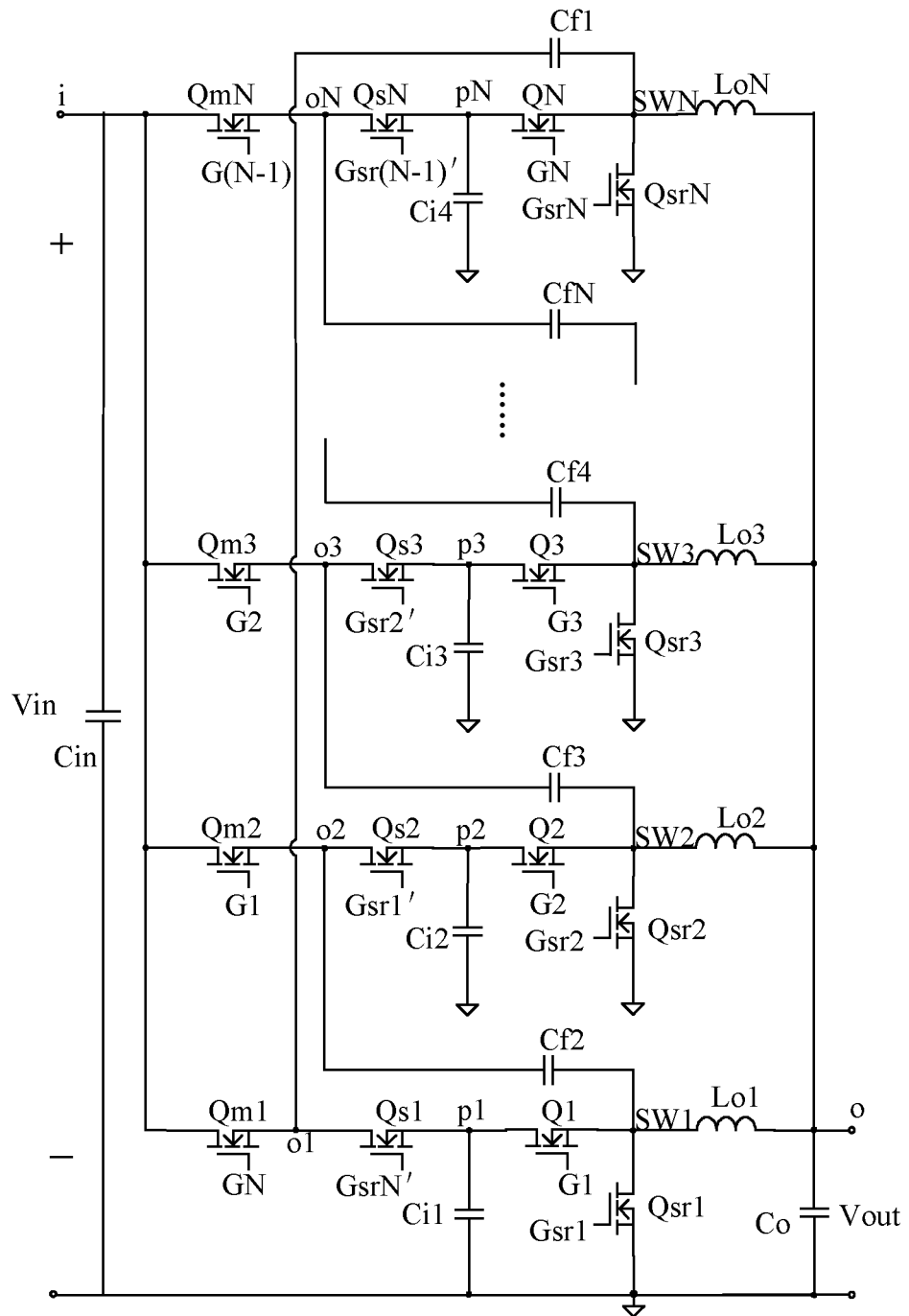
FIG. 3 is a schematic block diagram of a second example power converter, in accordance with embodiments of the present invention.

Referring now to FIG. 3, shown is a schematic block diagram of a second example power converter, in accordance with embodiments of the present invention. In this particular example, the power converter can include N circuit modules connected in parallel, where N is an integer greater than one. This power converter has a first port and a second port, and second terminals of the first port and the second port can connect to the reference ground. In this example, the first port can be used as an input port, and the second port used as an output port. It should be understood that the second port can also be used as an input port and the first port as an output port in other arrangements.

Each circuit module can include a switching power stage circuit, which can include a magnetic element and a switch group. Here, the magnetic element can be inductor Loj (j=1, 2, . . . , N), which can connect to switch node SWj and terminal "o" of the output port. The switch group can connect between terminal "i" of the input port and a first terminal of the switching power stage circuit (e.g., the input terminal of the switching power stage circuit), and can include transistors Qmj and Qsj connected in series.

Each circuit module also can include energy storage capacitor Cij for providing energy to the load of the power converter during the first operation stage. In this example, energy storage capacitor Cij can connect between first-type node pi of the switch group and the reference ground, where first-type node pi is the second terminal of the switch group, and here is also a common node of the switch group and the first terminal of the switching power stage circuit. In addition, the switching power stage circuit can include transistors Qj and Qsrj, which can connect in series between first-type node pi of the switching power stage circuit and the reference ground, and the common node of the third and fourth transistors is switch node SWj. In this example, transistors Qj and Qsrj, the inductor, and output capacitor Co together may form a buck circuit. When the first port is an output port and the second port is an input port, the third and fourth transistors, the inductor, and output capacitor Co together may form a boost circuit. It should be understood that the fourth transistor can also be replaced with a diode, and the switching power stage circuit can also be another switching power stage circuit including the third and fourth transistors and the magnetic element.

In addition, the power converter can include N energy storage capacitors Cfj, and each such energy storage capacitor may periodically store energy and release energy to the corresponding energy storage capacitor. Since each circuit module can include only one switch group, a first terminal of energy storage capacitor Cf(j+1) can connect to intermediate node o(j+1) of the switch group in current circuit module (j+1), and a second terminal of energy storage capacitor Cf(j+1) can connect to switch node SWj of the switching power stage circuit in previous circuit module j, where j=1, 2, 3, ..., N−1. For example, the first terminal of energy storage capacitor Cf1 can connect to intermediate node o1 of the switch group in circuit module 1, and the second terminal of energy storage capacitor Cf1 can connect to switch node SWN of the switching power stage circuit in circuit module N; that is, the previous circuit module of circuit module 1 is circuit module N. It should be understood that, for ease of description, j here can be 1 to (N−1). If there is no special description, j can still be 1 to N.

There can be different control methods for the power converter in particular embodiments. The first control method is in-phase control; that is, driving signals of the third transistors (e.g., Q1, Q2, Q3, ... QN) of the switching power stage circuit in all circuit modules can be the same, and may also be the same as driving signals of the first transistors (e.g., Qm1, Qm2, Qm3, ... QmN) of the switch groups in all circuit modules. The second control method is phase shift control; that is, phases of driving signals of the third transistors of the switching power stage circuit can be shifted by a predetermined angle (e.g., 360°/N). Of course, those skilled in the art will recognize that the above two control methods can be combined in some cases. The driving signals of the third transistors of some switching power stage circuits may be the same, and the driving signals of some third transistors can be phase-shifted, which will not be described in detail here.

In one embodiment, a driving signal of transistor Qm(j+1) connected to a first terminal of energy storage capacitor Cf(j+1) that connects to switch node SWj of the switching power stage circuit in circuit module j may be the same as a driving signal of transistor Qj in circuit module j, and both are Gj, where j=1, 2, 3, ..., N−1. For example, a driving signal of transistor Qm1 connected to a first terminal of energy storage capacitor Cf1 that connects to circuit module N may be the same as a driving signal of transistor QN in circuit module N. In addition, the driving signals of the third transistor and the fourth transistor (e.g., Qsr1, Qsr2, Qsr3, ... QsrN) in each switching power stage circuit may be complementary. In N circuit modules, the two transistors in each switch group may not be turned on synchronously, and a pulse width of driving signal Gsrj' of transistor Qsj may need to be within a pulse width of driving signal Gsrj of a corresponding transistor Qsrj, such that a conduction time of transistor Qsj is not greater than a conduction time of a corresponding transistor Qsrj. For example, the pulse width of driving signal Gsrj' of transistor Qsj and the pulse width of driving signal Gsrj of the corresponding transistor Qsrj can be equal.

The operating process of the power converter of this embodiment is the same as the above-mentioned power converter including two circuit modules. When transistor Qj of the switching power stage circuit in circuit module j is turned on; that is, during the first operation stage, energy storage capacitor Cij in circuit module j may provide energy to the load, while input voltage Vin may provide energy to energy storage capacitor Cf(j+1) connected to switch node SWj of the switching power stage circuit in circuit module j through transistor Qm(j+1) in circuit module (j+1), and may provide energy to the load, where j=1, 2, 3, ..., N−1. For example, when transistor QN is turned on, energy storage capacitor CiN in circuit module N may provide energy to the load, while input voltage Vin may provide energy to energy storage capacitor Cf1 connected to switch node SWN of circuit module N through transistor Qm1 in circuit module 1, and supply power to the load.

When transistor Qj of the switching power stage circuit in circuit module j is turned off, that is, during the second operation stage, energy storage capacitor Cf(j+1) connected to switch node SWj of the switching power stage circuit in circuit module j may release energy, in order to provide energy to energy storage capacitor Ci(j+1), where j=1, 2, 3, ..., N−1. For example, energy storage capacitor Cf1 connected to switch node SWN of the switching power stage circuit in circuit module N may release energy to provide energy to energy storage capacitor Ci1 in circuit module 1.

According to the inductance volt-second balance of the switching power stage circuit, the conversion ratio of output voltage Vout to input voltage Vin is still D/2. Since the power converter can include N circuit modules, the ripple of input current Iin can become smaller and smaller as the number of circuit modules increases, and input current Iin can become even greater continuous under the condition that the average value of the input current is the same, thereby greatly reducing the required input capacitor Cin, and reducing the size of the power converter.

Figure 4:
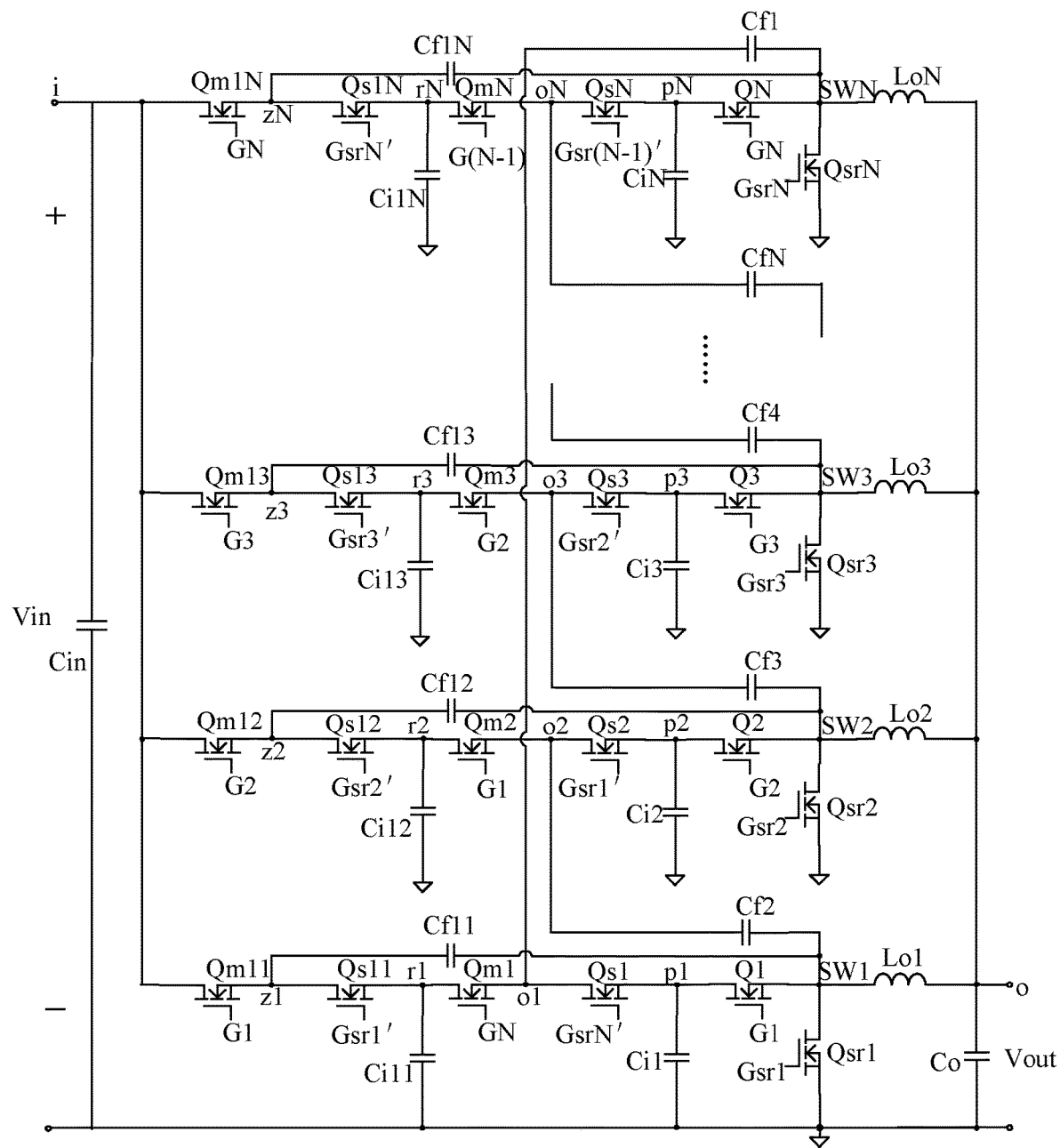
FIG. 4 is a schematic block diagram of a third example power converter, in accordance with embodiments of the present invention.

Referring now to FIG. 4, shown is a schematic block diagram of a third example power converter, in accordance with embodiments of the present invention. As discussed above, only expanding the number of circuit modules cannot change the voltage conversion ratio. Therefore, in order to achieve a higher voltage ratio, the power converter of FIG. 3 is further expanded here, such that each circuit module can include a plurality of switch groups and a switching power stage circuit. In this particular example, each circuit module can include two switch groups. Similarly, the first port of the power converter is the input port, and the second port of the power converter is the output port. Those skilled in the will recognize that the first port of the power converter may also be an output port, and the second port may be an input port.

In this embodiment, circuit module j can include a switching power stage circuit, two switch groups (first and second switch groups), and energy storage capacitors Cij and Ci1j. The switching power stage circuit can include magnetic element Loj, which can connect between switch node SWj and first terminal o of the output port, and transistors Qj and Qsrj. Driving signals of transistors Qj and Qsrj are Gj and Gsrj, respectively. Similarly, transistor Qj, transistor Qsrj, and magnetic element Loj may form a buck circuit. When the second port is an input port, and the first port is an output port, transistor Qj, transistor Qsrj, and magnetic element Loj may form a boost circuit. The first and second switch groups can connect in series between terminal "i" of the first port of the power converter and the first terminal of the switching power stage circuit, where the first switch group includes transistors Qmj and Qsj, and the second switch group includes transistors Qm1j and Qs1j.

Each first energy storage capacitor may respectively be connected between the first-type node of a corresponding switch group and the reference ground. For example, energy storage capacitor Cij can connect to first-type node pi of the first switch group (that is, the second terminal of the first switch group, here is a common node between the first switch group and the first terminal of the switching power stage circuit) and the reference ground. Energy storage capacitor Ci1j can connect between first-type node ri of the second switch group (that is, the second terminal of the second switch group, here is a common node of the second switch group and the first switch group) and the reference ground. In one embodiment, the power converter can also include 2N energy storage capacitors Cfj and Cf1j. A first terminal of each second energy storage capacitor can connect to the intermediate node of a different switch group, and the second terminal of each second energy storage capacitor can connect to a corresponding switch node of the switching power stage circuit in the current circuit module including the switch group connected with the first terminal thereof or in the previous circuit module for the current circuit module.

For example, a first terminal of energy storage capacitor $Cf(j+1)$ can connect to intermediate node $o(j+1)$ of the first switch group in circuit module $(j+1)$, and a second terminal of energy storage capacitor $Cf(j+1)$ can connect to switch node $SWj$ of the switching power stage circuit in circuit module j, where $j=1, 2, 3, \ldots, N-1$. For example, a first terminal of energy storage capacitor $Cf1$ can connect to intermediate node $o1$ of the first switch group in circuit module1, and a second terminal of energy storage capacitor $Cf1$ can connect to switch node $SWN$ of the switching power stage circuit in circuit module N; that is, the previous circuit module for circuit module 1 is circuit module N. Also, a first terminal of energy storage capacitor $Cf1j$ can connect to intermediate node $zj$ of the second switch group in current circuit module j, and a second terminal of energy storage capacitor $Cf1j$ can connect to switch node $SWj$ of the switching power stage circuit in circuit module j, where $j=1, 2, 3, \ldots, N$.

It should be understood that if another switch group is added to circuit module $(j+1)$, the added second energy storage capacitor can connect to the intermediate node of the added switch group and switch node $SWj$ of the switching power stage circuit in previous circuit module j. Therefore, every time a switch group is added, a first energy storage capacitor connected between the first-type node of the newly added switch group and the reference ground can be added, and a second energy storage capacitor can also be added. The added second energy storage capacitor and the previous second energy storage capacitor are alternately coupled to the previous circuit module or the current circuit module. Therefore, if there are M switch groups, there are M×N first energy storage capacitors, and M×N second energy storage capacitors. That is, each switch group corresponds to a first energy storage capacitor, and each switch group corresponds to a second energy storage capacitor.

In this embodiment, energy storage capacitors $Cf(j+1)$ and $Cf1j$ can connect to switch node $SWj$ of the switching power stage circuit in circuit module j. A driving signal of transistor $Qm(j+1)$ connected to a first terminal of energy storage capacitor $Cf(j+1)$ and a driving signal of transistor $Qm1j$ connected to a first terminal of energy storage capacitor $Cf1j$ may be the same as a driving signal of transistor Qj in circuit module j, both are Gj, where $j=1, 2, \ldots, N-1$. For example, energy storage capacitors Cf1 and Cf1N can connect to switch node SWN of the switching power stage circuit of circuit module N, and a driving signal of transistor Qm1 connected to a first terminal of energy storage capacitors Cf1 and a driving signal of transistor Qm1N connected to a first terminal of energy storage capacitors Cf1N may be the same as a driving signal of transistor QN, and both are GN.

The driving signals of the two transistors in each switch group may not overlap each other, and the driving signals of the third transistor and the fourth transistor in each switching power stage circuit may not overlap each other. For example, the driving signals of the third transistor and the fourth transistor in each switching power stage circuit can be complementary. A pulse width of driving signal $Gsrj'$ of the second transistors connected to the first transistors controlled by driving signal $Gj$ can be within a pulse width of driving signal $Gsrj$, such that a conduction time of the second transistor may not be longer than a conduction time of the corresponding fourth transistor. As mentioned above, the power converter can also have different control modes, such as in-phase control, out-of-phase control, or the combination thereof.

In this embodiment, the power converter can include multiple switch groups, such that during the first operation stage of the switching power stage circuit in circuit module j, input voltage Vin, part of the energy storage capacitors (e.g., Cij) in circuit module j, and part of the energy storage capacitors (e.g., $Ci1(j+1)$) in the next circuit module $(j+1)$ may provide energy to the load at the same time, where $j=1, 2, \ldots, N-1$. Energy storage capacitors $Cf(j+1)$ and $Cf1j$ connected to switch node $SWj$ of the same switching power stage circuit can store energy during the first operation stage, and may release energy to the corresponding energy storage capacitors $Ci(j+1)$ and $Ci1j$ during the second operation stage. Energy storage capacitor $Ci(j+1)$ corresponding to second energy storage capacitor $Cf(j+1)$ can connect to a first terminal of energy storage capacitor $Cf(j+1)$ through transistor $Qs(j+1)$, and energy storage capacitor $Ci1j$ corresponding to energy storage capacitor $Cf1j$ can connect to a first terminal of energy storage capacitor $Cf1j$ through transistor $Qs1j$.

For example, circuit module 1 will be utilized here to briefly describe its operation principle. When driving signal G1 is active, transistors Q1, Qm2, and Qm11 can be turned on, thereby generating three paths to switch node SW1. The first path is Ci1-Q1-SW1, and may form a switching power stage circuit with magnetic element Lo1. That is, energy storage capacitor Ci1 in the current circuit module can be used as a power source to provide energy to the load. The second path is Ci12-Qm2-Cf2-SW1, that is, energy storage capacitor Ci12 in the next circuit module may be used as a power source to provide energy to the load and to provide energy for charging energy storage capacitor Cf2 at the same time. The third path is Vin-Qm11-Cf11-SW1, where input voltage Vin may provide energy to the load, and to charge energy storage capacitor Cf11 at the same time.

When driving signal G1 is inactive, driving signals Gsr1 and Gsr1' can be active, transistors Qsr1, Qs2 and Qs11 may be turned on, inductor Lo1 can freewheel through transistor Qsr1, and energy storage capacitor Cf2 may release energy to charge energy storage capacitor Ci2 through transistor Qs2, such that energy storage capacitor Ci2 may act as a power source to supply power to the load when driving signal G2 is active. In addition, energy storage capacitor Cf11 may release energy to charge energy storage capacitor Ci11 through transistor Qs11, such that when driving signal GN is active next time, energy storage capacitor Ci11 may serve as a power source to supply power to the load. The operation principle of other circuit modules is substantially the same.

In the above operating process, according to the inductance volt-second balance principle, the relationship between output voltage Vout and input voltage Vin can be expressed: Vout/Vin=D/N, which can achieve a higher voltage conversion ratio to meet different needs. Further, the input and output ports of multiple circuit modules can be connected in parallel, which may reduce the ripple of the input current and the output current, thereby reducing the volume of the input capacitor and the output capacitor, and also reducing the volume of the power converter.

In particular embodiments, the previous module, the next module, and the current module mentioned herein are only used to indicate the order of naming for the convenience of explanation. While the example of the switching power stage circuit as a buck circuit is discussed herein, it should be understood that when the input and output ports are exchanged, the switching power stage circuit is a boost circuit, and the operation principle of the boost circuit may correspond to that of the buck circuit, with associated operation.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power converter, comprising:
    a) a plurality of circuit modules coupled in parallel between a first port and a second port, wherein each of the plurality of circuit modules comprises a switching power stage circuit having a first magnetic element coupled between a switch node of the switching power stage circuit and a first terminal of the second port, at least one switch group having first and second transistors and being coupled between a first terminal of the first port and a first terminal of the switching power stage circuit, and at least one first energy storage capacitor for providing energy to a load of the power converter;
    b) a plurality of second energy storage capacitors configured to periodically store energy and release energy to corresponding first energy storage capacitors;
    c) wherein the switching power stage circuit comprises third and fourth transistors coupled between the first terminal of the switching power stage circuit and a reference ground, and an intermediate node of the third and fourth transistors is configured as the switch node; and
    d) wherein a driving signal of the first transistor coupled to a first terminal of the second energy storage capacitor that is coupled to the switch node of the same switching power stage circuit is the same as a driving signal of the third transistor in the same switching power stage circuit.

2. The power converter of claim 1, wherein each of the at least one first energy storage capacitor is coupled between a first-type node of a corresponding one of the switch groups and the reference ground, and the reference ground is configured as second terminals of the first port and the second port.

3. The power converter of claim 1, wherein each of the at least one switch group corresponds to one first energy storage capacitor and one second energy storage capacitor.

4. The power converter of claim 1, wherein driving signals of the third transistors in each circuit module are the same with each other.

5. The power converter of claim 1, wherein driving signals of the first and second transistors in each switch group do not overlap each other, driving signals of the third and fourth transistors in each switching power stage circuit do not overlap each other, and a conduction time of the second transistor in each switch group is not greater than a conduction time of a corresponding fourth transistor.

6. The power converter of claim 1, wherein the first port and the second port are respectively coupled in parallel with a filter capacitor.

7. The power converter of claim 1, wherein the first port is one of an input port and an output port of the power converter, and the second port is the other of the input port and the output port.

8. The power converter of claim 1, wherein a ratio of an output voltage to an input voltage of the power converter is D/N, where D is a duty cycle of the switching power stage circuit, and N is a number of the circuit modules that is an integer greater than one.

9. The power converter of claim 1, wherein each of the plurality of second energy storage capacitors has a first terminal coupled to an intermediate node of a corresponding one of the switch groups and a second terminal coupled to a switch node of the switching power stage circuit in a current circuit module comprising the switch group connected with the first terminal thereof or a previous circuit module for the current circuit module.

10. The power converter of claim 9, wherein the second terminal of the second energy storage capacitor coupled to an intermediate node of an i-th switch group is coupled to the switch node of the switching power stage circuit in the previous circuit module, and i is configured as an odd number, wherein a first switch group is connected to the first terminal of the switching power stage circuit.

11. The power converter of claim 9, wherein the second terminal of the second energy storage capacitor coupled to an intermediate node of a j-th switch group is coupled to the switch node of the switching power stage circuit in the current circuit module, and j is configured as an even number, wherein a first switch group is connected to the first terminal of the switching power stage circuit.

12. The power converter of claim 1, wherein during a first operation stage, an input voltage of the power converter and the at least one first energy storage capacitor provide energy to a load of the power converter.

13. The power converter of claim 12, wherein the at least one switch group comprises one switch group, and during the first operation stage, the input voltage and the first energy storage capacitor provide energy to the load.

14. The power converter of claim 12, wherein the at least one switch group comprises a plurality of switch groups, and during the first operation stage, the input voltage, part of the first energy storage capacitors in a current circuit module and part of the first energy storage capacitors in a previous circuit module provide energy to the load.

15. The power converter of claim 1, wherein the second energy storage capacitors that are coupled to a switch node of the same switching power stage circuit by a terminal thereof store energy during a first operation stage of the switching power stage circuit, and release energy to corresponding first energy storage capacitors during a second operation stage.

16. The power converter of claim 15, wherein the corresponding first energy storage capacitor is coupled to a first terminal of a corresponding one of the second energy storage capacitors via a corresponding second transistor.

17. The power converter of claim 15, wherein driving signals of the third transistors in each circuit module are phase-shifted by a predetermined angle and have the same period and duty cycle.

18. The power converter of claim 17, wherein the predetermined angle is configured as 360°/N, and N is an integer greater than one.

* * * * *